(12) United States Patent
Fassbender et al.

(10) Patent No.: US 11,802,631 B2
(45) Date of Patent: Oct. 31, 2023

(54) DIAGNOSTIC DEVICE, SYSTEM AND METHOD

(71) Applicant: Festo SE & Co. KG, Esslingen (DE)

(72) Inventors: Bastian Fassbender, Stuttgart (DE); Patrick Laux, Stuttgart (DE); Holger Steltner, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 16/580,760

(22) Filed: Sep. 24, 2019

(65) Prior Publication Data

US 2020/0096132 A1 Mar. 26, 2020

(30) Foreign Application Priority Data

Sep. 25, 2018 (DE) .......................... 102018216338.3

(51) Int. Cl.
*F16K 37/00* (2006.01)

(52) U.S. Cl.
CPC ................................ *F16K 37/0041* (2013.01)

(58) Field of Classification Search
CPC .................................................. F16K 37/0041
See application file for complete search history.

(56) References Cited

U.S. PATENT DOCUMENTS

| | | | | |
|---|---|---|---|---|
| 4,888,996 A | * | 12/1989 | Rak | F16K 31/046 73/862.193 |
| 5,154,206 A | * | 10/1992 | Gillott | F02C 9/26 137/554 |
| 5,966,679 A | * | 10/1999 | Snowbarger | F16K 37/0083 700/282 |
| 7,225,790 B2 | * | 6/2007 | Bartunek | F02M 65/005 123/294 |
| 2013/0221250 A1 | * | 8/2013 | Judge | F16K 37/0025 137/554 |
| 2017/0246931 A1 | * | 8/2017 | Bourqui | B60H 1/00871 |
| 2018/0335790 A1 | * | 11/2018 | Imsland | G05D 7/0635 |
| 2018/0356845 A1 | * | 12/2018 | Yasuda | F16K 31/004 |
| 2019/0113910 A1 | | 4/2019 | Wagner-Stuerz | |

FOREIGN PATENT DOCUMENTS

| | | | | |
|---|---|---|---|---|
| DE | 2020004020347 U1 | 6/2005 | | |
| DE | 102012111883 A1 | 6/2014 | | |
| DE | 102017124293 A1 | * 4/2019 | ......... | G05B 19/4184 |
| EP | 2381149 A2 | 10/2011 | | |
| EP | 2562455 A1 | 2/2013 | | |

* cited by examiner

*Primary Examiner* — Angelisa L. Hicks
(74) *Attorney, Agent, or Firm* — Hoffmann & Baron, LLP (57) ABSTRACT

A diagnostic device (1) for a valve drive (19) having a drive element (9) for driving a valve member (14) of a process valve (12). The diagnostic device (1) is configured to perform a play detection procedure to detect play between the drive element (9) and the valve member (14) and to provide play information in accordance with the detected play.

15 Claims, 4 Drawing Sheets

DIAGNOSTIC DEVICE, SYSTEM AND METHOD

BACKGROUND OF THE INVENTION

The invention relates to a diagnostic device for a valve drive. The valve drive has a drive element for driving a valve member of a process valve.

Devices and methods for diagnosing a valve drive and/or a valve fitting are known from the prior art.

For example, EP2381149B1 describes, for a positioning device with a control fitting, the determination of a balance of forces between a holding force and a driving force on the basis of recorded sound.

Furthermore, EP2562455B1 describes a method for determining the position of a valve. A pressure is recorded continuously over time and a pressure change over time is determined. Based on the pressure change, a physical travel variable, such as the position, the travel time or the travel of the valve, is determined.

SUMMARY OF THE INVENTION

An object of the invention is to modify the diagnostic device so that the operating safety can be increased.

The object is achieved by a diagnostic device according to claim 1. The diagnostic device is configured to perform a play detection procedure to detect play between the drive element and the valve member and to provide play information in accordance with the detected play.

Between the drive element and the valve member, play may arise and increase over time due to, for example, wear, loosening, corrosion or the like. Play means that the valve member is movable relative to the drive element, in the direction of the drive movement provided by the drive element. This results in a range—hereinafter also referred to as a play range—in which the drive element performs its drive movement, but the valve member is not yet carried along because of the play and remains in its current position. The play range is in particular a linear and/or rotary deflection range, in which the drive element and the valve member can be moved independently of one another in the drive direction. Only after the relative deflection of the drive element to the valve member leaves the play range is the valve member carried along by the drive element, i.e. driven by the drive element.

As a result of increasing play, it is possible that the actual position of the valve member increasingly deviates from a prescribed and/or measured position, in particular a prescribed and/or measured position of the drive element. In extreme cases, the valve member cannot be completely closed and/or can no longer be moved due to play between the drive element and the valve member. As a result, the operating safety is impaired.

By means of the diagnostic device being configured to perform the play detection procedure and provide play information in accordance with the detected play, the presence, and preferably also the extent, of the play can be detected early. It becomes possible to react early to the existing play, for example by determining the need for maintenance and providing corresponding maintenance information in accordance with the provided play information. By detecting the play and providing the play information, the operating safety can consequently be increased.

In a preferred embodiment, the detection of the play is done by means of existing sensors—in particular by using a position sensor unit already present for position detection of the drive element, and/or using an existing pressure sensor unit. A sensor for direct recording of the position of the valve member is expediently not needed and is preferably not present.

Advantageous further embodiments are the subject matter of the dependent claims.

The invention further relates to a method for detecting play between a drive element of a valve drive and a valve member of a process valve driven by the drive element, comprising the steps of: detecting play between the drive element and the valve member and providing play information according to the detected play.

The method is expediently carried out with the aid of the described diagnostic device and/or is provided in accordance with one of the described embodiments of the diagnostic device.

BRIEF DESCRIPTION OF THE DRAWINGS

An exemplary embodiment is explained below with reference to the figures, wherein.

DETAILED DESCRIPTION

Figure 1:
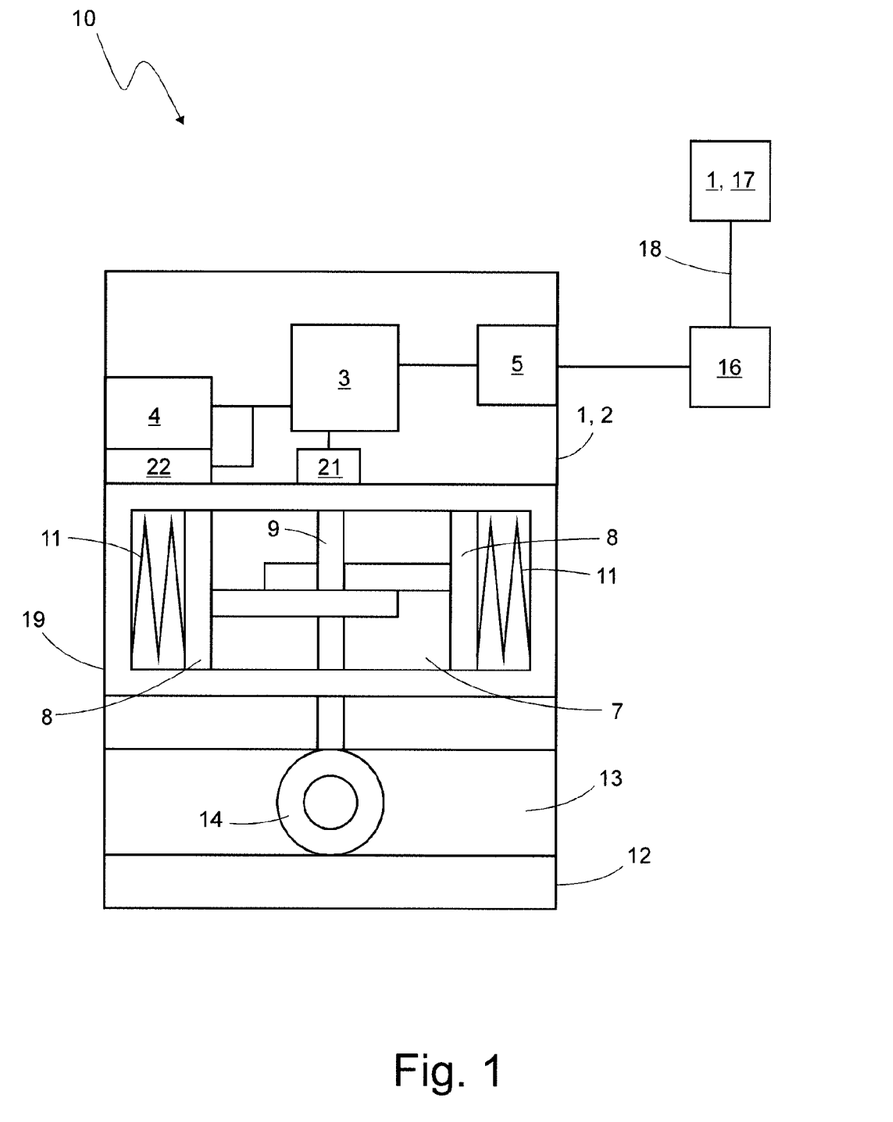
FIG. 1 shows a schematic representation of a system comprising a diagnostic device, a valve drive and a process valve.

FIG. 1 shows a system 10, which represents an exemplary use environment for the diagnostic device 1 according to the invention. The system 10 includes the diagnostic device 1, a valve drive 19 and a process valve 12.

The diagnostic device 1 is exemplarily implemented in a control device 2, which is designed in particular as a position controller, control head and/or positioner. Alternatively or additionally, the diagnostic device 1 can also be implemented on an external server 17, which is connected to the control device 2 exemplarily via a gateway 16 and/or via a wide area network 18, in particular the internet.

The valve drive 19 comprises a drive element 9 for driving a valve member 14 of the process valve 12. The diagnostic device 1 is designed to perform a play detection procedure to detect play between the drive element 9 and the valve member 14 and to provide play information in accordance with the detected play.

Further exemplary details are explained below.

First, regarding the control device 2:

The control device 2 serves to provide a working pressure for actuating the valve drive 19. For this purpose, the control device 2 has, in particular, a fluid device 4, for example one or more pilot valves.

By way of example, a sensor arrangement is provided which in particular comprises a pressure sensor unit 22 in order to measure the pressure which is provided to the valve drive 19. The pressure is measured, for example, at the fluid device 4, a pressure chamber 7 of the valve drive 19, and/or a fluidic line (not shown in the figures) between the control device 2 and the valve drive 19. The pressure sensor unit 22 is exemplarily part of the control device 2, but may alternatively be provided separately from the control device 2.

The control device 2 further has a control unit 3, which exemplarily has one or more processors and is designed to control the fluid device 4, in particular according to a control and/or regulator model stored in the control unit 3 and adapted to the valve drive 19. The control unit 3 is designed, for example, as a microcontroller.

The control device 2 further exemplarily has a communication device 5, with which the control device 2 can in particular communicate with a superordinate control (not shown), for example to obtain a control command according to which the fluid device 4 is to be controlled. The control command in particular comprises a position signal which prescribes a position for the drive element 9 and/or the valve member 14. The communication device 5 can be used for communication with the (optional) external server 17.

The sensor arrangement exemplarily includes a position sensor unit 21 in order to detect the position, for example a rotational position and/or a linear deflection, of the drive element 9. The position sensor unit 21 may in particular be configured to detect the position of the drive element 9 magnetically (i.e. by detecting a magnetic field of a magnet fastened to the drive element 9), optically and/or mechanically. The position sensor unit 21 is exemplarily part of the control device 2. Alternatively, the position sensor unit 21 may also be provided separately from the control device 2. The position sensor unit 21 comprises in particular a magnetic sensor.

Preferably, the control device 2, in particular the entire system 10, comprises no sensor or sensors for direct recording of the position of the valve member 14. Expediently, the control device 2 is configured to indirectly detect the position of the valve member 14—namely via the position of the drive element 9 detected by the position sensor unit 21.

Expediently, the control device 2 has a housing in which the control unit 3, the fluid device 4, the communication device 5, the pressure sensor unit 22 and/or the position sensor unit 21 are housed. The housing optionally has a mechanical interface (not shown) with which it can be attached to the valve drive 19.

Now, regarding the valve drive 19:

The valve drive 19 is exemplarily designed as a single-acting valve drive, but may alternatively be designed as a double-acting valve drive. Furthermore, the valve drive 19 is exemplarily designed as a rotary or pivot drive and may alternatively be designed as a linear drive.

The valve drive 19 has at least one pressure chamber 7 and one piston assembly 8. Working pressure provided by the control device 2 can be applied to the pressure chamber 7 in order to set the piston assembly 8 in motion. In turn, the drive element 9 is set in motion via the piston assembly 8. The drive element 9 is exemplarily designed as a drive shaft. Alternatively, the drive element 9 may also be designed as a piston rod. The drive element 9 is mechanically coupled to the valve member 14, so that the valve member 14 can be driven by the drive element 9.

For example, the valve drive 19 has a return spring arrangement 11 with which a return force is applied to the piston assembly 8. The return force counteracts a pressurised fluid force acting on the piston assembly 8 due to the working pressure. In particular, the pressurised fluid force acts in a first movement direction of the actuator 15 and the return force acts in a second movement direction counter (i.e. opposite) to the first movement direction.

Next, regarding the process valve 12:

The process valve 12 has a process fluid channel 13, in which the valve member 14 is arranged. The valve member 14 can be actuated by the valve drive 19, in particular the drive element 9, so that it changes its position. By way of example, the valve member 14 can be displaced into different rotational positions. The valve member 14 can expediently be displaced into a first and second end position. Furthermore, the valve member 14 can be displaced into one or several, or any number of positions between the two end positions. This is preferably a proportional actuation. In the first end position, for example, the process fluid channel 13 is blocked and in the second end position the process fluid channel 13 is released. The valve fitting 12 can in particular be designed as a butterfly valve or a ball valve.

During operation, the control device 2 is used in particular to displace, by providing a working pressure, the drive element 9 and/or the valve member 14 into a position prescribed by a position signal. The position signal can in particular be provided by the control device 2, the server 17 and/or a superordinate control (not shown).

The control device 2 is configured to provide the working pressure so that the valve member 14 moves in a specific movement direction.

The assembly of a control device 2, valve drive 19 and process valve 12 may also be referred to as a positioning device. The valve drive 19 is operated in particular pneumatically, so that said assembly can also be referred to as a pneumatically operated positioning device. The positioning device serves in particular for use in the process industry. Expediently, the positioning device is used to regulate a process fluid flow. The process valve 12 is in direct contact with the process fluid flow. By changing the position of the valve member 14, the flow of the process fluid can be varied. The valve drive 19 is designed in particular as a pneumatic pivot or linear drive. The drive element 9 of the valve drive 19, in particular a shaft or piston rod, is connected to the valve member 14, for example via a shaft or rod of the valve member 14. The control device 2 is configured to control, in response to a target value for a deflection of the pneumatic valve drive 19, the target value being prescribed by a position signal, pneumatic valves, such as valves of the fluid device 4, for aeration or deaeration of the pressure chamber 7 in such a way that a detected position—in particular a position detected by the position sensor unit 21—corresponds to the prescribed target value.

The mechanical coupling between the drive element 9 and the valve member 14 may be designed in various ways.

Preferably, the drive element 9 is mechanically connected directly to the valve member 14—for example, to a rod-shaped portion of the valve member 14. Expediently, the drive element 9 is positively connected to the valve member 14, so that a rotary and/or linear movement of the drive element 9 can be transmitted to the valve member 14.

Expediently, the drive element 9 and the valve member respectively have coupling sections via which they are mechanically coupled to one another. For example, a coupling projection and a corresponding coupling recess, into which the coupling projection engages, may serve as coupling sections. The coupling projection is for example a square. Expediently, the coupling projection is arranged on the valve member 14, for example on a rod-shaped portion of the valve member 14, and the coupling recess is arranged on the drive element 9. In particular, the drive elements 9 formed as shafts of swivel fittings such as butterfly and ball valves usually end in a square. The valve drive 9 and the process valve 12 preferably respectively comprise housings, which can be expediently bolted together. Expediently, the coupling of the two coupling sections takes place when the housings of the valve drive 9 and the process valve 12 are screwed together.

Furthermore, the drive element 9 and the valve member may be indirectly mechanically coupled, for example via an adapter piece. An adapter piece can be used in particular if the housings of the valve drive 19 and of the process valve 12 are connected via a mounting bracket.

Furthermore, the drive element 9 and the valve member 14 may also be connected to one another via a clamping mechanism and/or a screwing mechanism. Such a connection can be used, in particular, in a valve drive 19 designed as a membrane or piston drive and/or in a process valve 12 designed as a stroke valve or slide valve.

As already mentioned above, there may be play between the drive element 9 and the valve member 14. The play can also be referred to as mechanical play, as slack, as lash or as backlash. The play is usually undesirable and can arise in particular through manufacturing tolerances and/or wear. The result of the play is that the drive element 9 can be moved in the drive direction relative to the valve member 14 within a certain range—the "play range"—without the valve member 14 being driven by the drive element 9 or carried along by the drive element 9. In the example shown, in which the valve drive 19 provides a rotational movement of the drive element 9 as a drive movement, the drive element 9 can be moved within a certain angular range in the presence of play without the valve member 14 being changed in its position.

Figure 2:
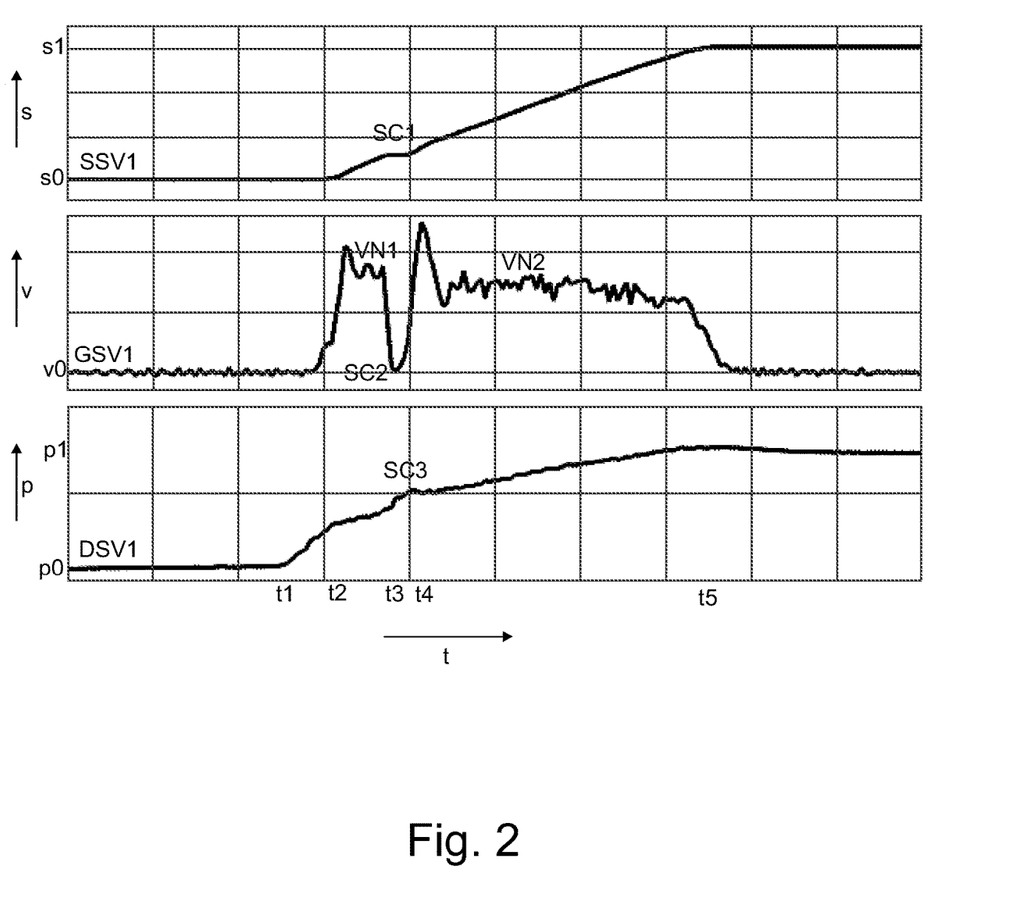
FIG. 2 shows three signal profiles in the case where play is present.
Figure 3:
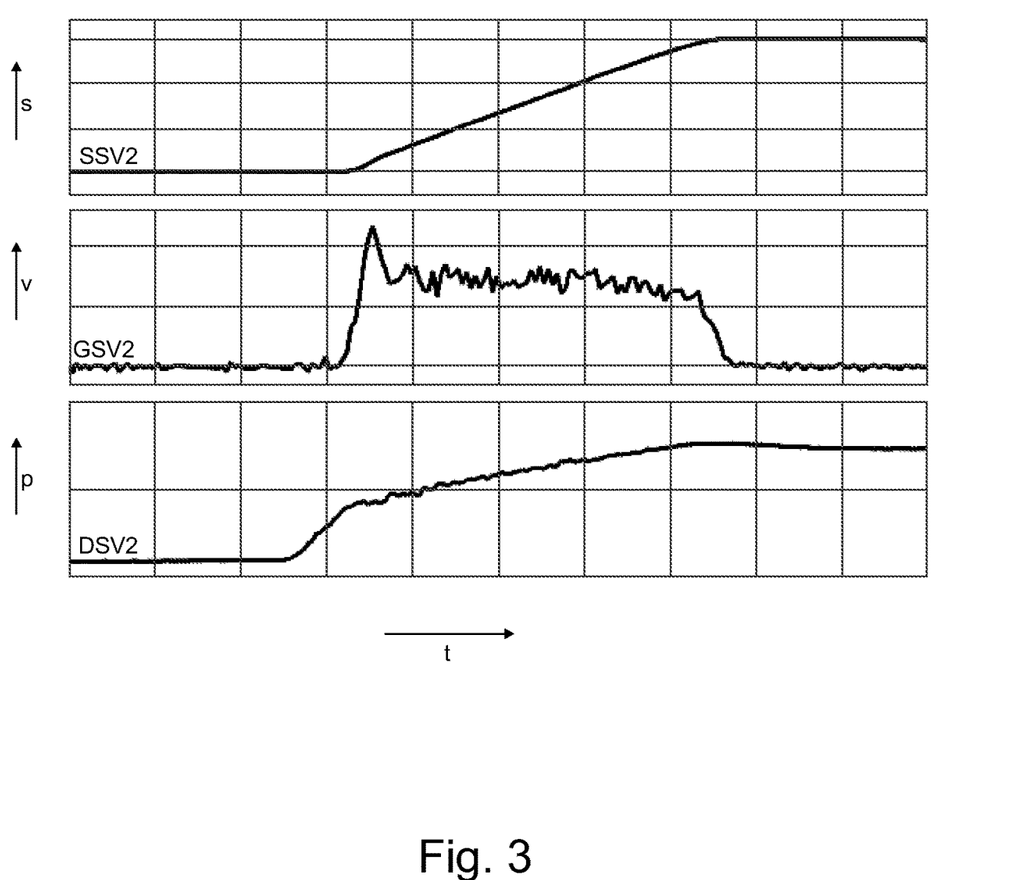
FIG. 3 shows three signal profiles in the case where no play is present.

Next, with reference to FIGS. 2 and 3, an exemplary detection of the play will be explained:

FIGS. 2 and 3 show respectively three temporal signal profiles which have been recorded for example by the above-mentioned sensor arrangement, i.e. in particular the pressure sensor unit 22 and/or the position sensor unit 21. Signal profiles may also be referred to as signals or as signal graphs.

In FIG. 2, the case is shown in which play is present between the drive element 9 and the valve member 14. In FIG. 3, the case is shown in which no play is present between the drive element 9 and the valve member 14.

FIG. 2 shows the first signal profiles SSV1, GSV1 and DSV1, and FIG. 3 shows the second signal profiles SSV2, GSV2 and DSV2. The position signal profiles SSV1, SSV2 show a position s, the velocity signal profiles GSV1, GSV2 show a velocity v and the pressure signal profiles DSV1, DSV2 show a pressure p. The signal profiles of both FIGS. 2 and 3 respectively show the response to a position change of the drive element 9 prescribed by a position signal. Both FIGS. 2 and 3 respectively show the same prescribed position change. In particular, this is a position change in which the drive element 9 is moved in the first movement direction, i.e. counter to the restoring force.

The signal profiles of a figure are respectively shown in synchronism with one another, i.e. the signal profiles SSV1, GSV1, and DSV1 respectively have the same time axis, and the signal profiles SSV2, GSV2, and DSV2 respectively have the same time axis.

The position signal profiles SSV1, SSV2 show the position of the drive element 9—for example, a rotational position of the drive element 9. The position signal profiles SSV1, SSV2 are recorded e.g. by the position sensor unit 21. The velocity signal profiles GSV1, GSV2 show the velocity of the drive element 9, for example the rotational speed of the drive element 9. The velocity signal profiles GSV1, GSV2 are, for example, obtained by differentiating the position signal profiles SSV1, SSV2.

The pressure signal profiles DSV1, DSV2 show the pressure provided to the valve drive 19, for example the pressure present in the pressure chamber 7. The pressure signal profiles DSV1, DSV2 are recorded by the pressure sensor unit 22, for example. The pressure shown in the pressure signal profiles DSV1, DSV2 or the pressure recorded by the pressure sensor unit 22 may in particular also be a pressure difference. If, for example, unlike in FIG. 1, there is no single-acting valve drive but rather a double-acting valve drive, which has two pressure chambers, then the recorded/tracked pressure can be the pressure difference between the two pressure chambers.

First, regarding FIG. 2:

Here, the positioning device is initially in a state of rest. The drive element 9 is in an initial position s0, for example, a first end position, the velocity v0 of the drive element 9 is zero and the pressure chamber 7 is supplied with the output pressure p0, for example, the ambient pressure.

In the control device 2, a first position signal is now provided which prescribes a position change of the drive element 9 to a first desired position s1, for example a second end position.

Accordingly, the control device 2 at time t1 starts to apply pressure to the valve drive 19 in order to set the drive element 9 in motion. For example, the control unit 3 controls the fluid device 4 in order to achieve a target pressure p1 in the pressure chamber 7.

The pressure in the pressure chamber 7 initially rises continuously. At time t2, the pressure in the pressure chamber 7 is great enough to overcome the holding force counteracting a movement of the drive element 9. The pressure at t2 can also be called the breakaway pressure. The velocity v of the drive element 9 initially increases very sharply at t2 and then remains at a first velocity level VN1. The position s of the drive element 9 begins to increase at t2; the increase is initially linear here.

The slope of the pressure v decreases from t2 with respect to the slope between t1 and t2. This is because the volume of the pressure chamber 7 increases from t2 (due to the moving piston assembly 8), which counteracts the increase of the pressure in the pressure chamber 7 and thus slows the increase of the pressure.

In the position change of the drive element 9 made between t1 and t2, the valve member 14 has not moved along with the drive element 9 due to existing play between the drive element 9 and the valve member 14. Here, the drive element 9 is still in the play range. At t3, the drive element 9 has passed through the play range. A higher force now acts on the drive element 9, which force acts counter to the position change, the force comprising in particular a holding force and/or sliding friction force acting on the drive element 9 and a holding force and/or a sliding friction force acting on the valve member 14. Accordingly, the velocity v temporarily sharply decreases from t3. As an example, the velocity v drops to zero. Accordingly, the slope of the position signal profile is reduced. Furthermore, the slope of the pressure signal profile increases at t3, since the pressure chamber 7 expands temporarily more slowly or not at all.

At t4, the pressure in the pressure chamber 7 is great enough to drive the drive element 9 together with the actuator 14. Accordingly, the velocity v increases sharply again, the position s increases again, and the slope of the pressure signal profile decreases again. The velocity v after t4 is at a second velocity level VN2, which is exemplary less than the first velocity level VN1.

The temporary reduction in the slope of the position signal profile (between t3 and t4) shall also be referred to as the first signal characteristic SC1. Furthermore, the temporary drop or decline of the velocity (between t3 and t4) shall be referred to as a second signal characteristic SC2 and the temporary increase of the slope of the pressure signal profile shall be referred to as a third signal characteristic SC3.

At t5, the drive element 9 reaches the desired position. The control device 2 detects this state. The position s remains constant when the position s1 is reached; the velocity drops to 0.

In FIG. 3, the case for the same prescribed position change of the drive element 9 is shown, in which no play is present between the drive element 9 and the valve member 14. The signal profiles of FIG. 3 essentially correspond to the signal profiles of FIG. 2, but differ therefrom in particular in that the three signal characteristics SC1, SC2 and SC3 are not present. Furthermore, in the case of FIG. 3, the breakaway pressure is increased since, from the beginning, the drive element 9 and the valve member 14 must be set in motion together, so that a higher force must be overcome and, consequently, a higher breakaway pressure is necessary.

The diagnostic device 1 is preferably configured to detect the play on the basis of the position s and/or velocity v of the drive element 9 and/or on the basis of the pressure p of the valve drive 19.

In particular, the diagnostic device 1 is configured to record a temporal signal profile SSV1, GSV1 and/or DSV1 of the position s and/or velocity v of the drive element 9 and/or of the pressure p of the valve drive 19, to detect, within the recorded temporal profile, a signal characteristic SC1, SC2 and/or SC3, and to detect the play on the basis of the detected signal characteristic.

Preferably, the diagnostic device 1 is configured to detect a reduction in the velocity of the drive element 9 as the signal characteristic SC2, on the basis of which the detection of the play takes place. In particular, the diagnostic device 1 is configured to detect the velocity drop explained above, i.e. in particular the drop of the velocity from the first velocity level VN1 to a velocity lowest point, in particular the zero point, and/or to detect the subsequent increase to the velocity level VN2, in particular from the velocity lowest point.

Alternatively or additionally, the diagnostic device 1 can also be configured to detect the play on the basis of the recorded pressure, in particular a detected increase in the pressure, in particular an increase in the slope of the pressure. Preferably, the diagnostic device 1 is configured to detect a temporary increase in the slope of the pressure and/or a subsequent reduction in the slope of the pressure as the signal characteristic SC3.

Hereinafter, further exemplary methods will be mentioned, with which the signal characteristic SC1, SC2 and/or SC3 can be detected.

The diagnostic device 1 is expediently configured to detect the signal characteristic SC1, SC2 and/or SC3 by recognising one or more features after the start of a movement of the drive element 9 in the direction of the target position prescribed by the position signal.

In particular, the diagnostic device 1 is configured to detect that the absolute value of the velocity of the drive element 9 falls below a predetermined velocity threshold, in particular after the absolute value of the velocity has previously exceeded a predetermined minimum value. On the basis of this detection, the diagnostic device 1 can then infer the presence of the signal characteristic SC2.

Furthermore, the diagnostic device 1 can be configured to detect that the change in the velocity of the drive element 9, in particular the absolute value thereof, exceeds a predetermined threshold value. Also on the basis of this detection, the diagnostic device 1 can infer the presence of the signal characteristic SC2.

Furthermore, the diagnostic device 1 can be configured to compare a currently recorded position of the drive element 9 with an expected position and, if the deviation between the currently detected position and the expected position exceeds a threshold value, to conclude the presence of the first signal characteristic SC1. The diagnostic device 1 is in particular configured to determine the expected value on the basis of an extrapolation of previously recorded positions taking into account the movement direction of the drive element. The extrapolation may be based on a linear regression, for example, but it can also be based on a Kalman filtering or another movement model.

Furthermore, the diagnostic device 1 may be configured to compare a currently measured value of the supplied pressure with an expected pressure value and, if the deviation between the recorded value and the expected value exceeds a threshold value, to conclude the presence of the signal characteristic SC3. The diagnostic device 1 is in particular configured to determine the expected pressure value on the basis of an extrapolation of previously recorded pressure values, taking into account the control signal, that is, whether aerating or deaerating of the pressure chamber 7 is to take place. The extrapolation can be based on a model that describes the pressure profile in the pressure chamber 7.

The detection of play may be based on one or more of the signal characteristics SC1, SC2, SC3 and/or the abovementioned signal characteristic detection methods. Expediently, various methods can be combined.

Preferably, the diagnostic device 1 is further configured to detect that the first signal characteristic SC1, the second signal characteristic SC2 and/or the third signal characteristic SC3 is/are not present. In this case, the diagnostic device 1 may provide as the play information the information that there is no play; in particular the information that the play is zero.

If the diagnostic device 1 detects that there is play, the diagnostic device 1 may provide as the play information the (qualitative) information that play is present. The diagnostic device 1 may further be configured to provide in this case quantitative information—a play value—indicating the extent of the play. The extent of the play is in particular the size of the play range—i.e. how far the drive element 9 can be moved relative to the valve member 14 in the drive direction.

The diagnostic device 1 is expediently configured to determine the play value in accordance with a time and/or a signal value of the signal characteristic SC1, SC2 and/or SC3.

In particular, the diagnostic device 1 is configured to detect at which time (from the beginning of the pressurisation—i.e. from t1)—the signal characteristic SC1, SC2 and/or SC3 occurs. The diagnostic device 1 is designed to determine the play value according to this time—the later the time, in particular relative to a start time of the play detection procedure and/or an evaluation procedure, the greater the play and the greater the play value.

Alternatively or additionally, the diagnostic device 1 is configured to detect at which position the signal characteristic SC1, SC2 and/or SC3 occurs. The diagnostic device 1 is designed to determine the play value according to this position—the larger the position, the greater the play and the greater the play value. In particular, the play value is determined based on a difference between the position and a reference position at the beginning of the play detection procedure and/or an evaluation procedure. The greater this position difference, the greater the play value.

Expediently, the diagnostic device 1 is configured to perform the play detection procedure in response to a position signal. The position signal is provided in particular in the control device 2. The position signal specifies, for example, a position of the drive element 9. Expediently, the fluid device 4 is driven in accordance with the position signal.

The position signal expediently represents a time trigger and/or a condition for the play detection procedure.

In particular, the diagnostic device 1 is configured to perform the play detection procedure only if the position signal fulfils one or more requirements. For example, the diagnostic device 1 is configured to perform the play detection procedure in particular only when the deviation between a current position of the drive element 9 and a target position prescribed by the position signal is greater than a predetermined threshold value and/or when the target position prescribed by the position signal is in a different movement direction to the movement direction of the last executed movement of the drive element 9.

Preferably, the diagnostic device 1 is configured to detect that the deviation between a current position of the drive element 9 and a target position prescribed by the position signal is greater than a predetermined threshold value and/or that the target position prescribed by the position signal is in a different movement direction to the movement direction of the last executed movement of the drive element 9, and is configured to perform, in response to this detection, the play detection procedure.

The diagnostic device 1 is in particular configured to take into account, during the play detection procedure, the magnitude of a position change of the drive element 9 to be caused by the first position signal.

In particular, the diagnostic device 1 is configured to ensure that a predetermined minimum difference between the current target position and the previous target position or the currently recorded position is given. This increases the likelihood that the drive element 9 will move long enough to reach a sufficiently high velocity of movement—for example, the first velocity level VN1—so that the signal characteristic SC2 shows a sufficiently sharp deceleration or a sufficiently great drop in velocity.

Furthermore, the diagnostic device 1 can be configured to take into account the control of the fluid device 4 in the play detection procedure, in particular whether the fluid device 4 is controlled such that the opening degree of one or more valves of the fluid device 4 is above a predetermined threshold value. Expediently, the diagnostic device 1 checks whether the opening degree is, for at least a predetermined time duration, above the threshold value. Specifically, the diagnostic device 1 is configured to execute the play detection procedure in response to the opening degree being over the threshold value. In this way, the diagnostic device 1 is configure to ensure that the valves of the fluid device 4 are opened long enough and far enough to reach a sufficiently high velocity of movement in order to reliably detect the signal characteristic SC2.

The diagnostic device 1 is expediently configured to take into account, during the play detection procedure, in which movement direction the drive element 9 has to be moved for reaching the target position prescribed by the position signal. In particular, the diagnostic device 1 is configured to adapt the detection of the signal characteristic SC1, SC2 and/or SC3 on the basis of the movement direction.

The diagnostic device 1 is configured to take into account, during the play detection procedure, an earlier position of the drive element 9, which was caused by a second position signal, which was provided before a first (current) position signal. In particular, by taking into account the previous position, the diagnostic device 1 can determine how a currently recorded position, in which the signal characteristic SC1, SC2 and/or SC3 has been detected, relates to the previous position, and deduce therefrom the extent of the play.

The diagnostic device 1 is expediently configured to record the earlier position, for example, on the basis of the second position signal, namely from the target position prescribed by the second position signal, and/or by detection by means of the position sensor unit 21. The diagnostic device 1 is configured to store the previous position as a position reference value sref.

The diagnostic device 1 is further configured to calculate the difference between the current position, at which the signal characteristic SC1, SC2 and/or SC3 was recorded, and the position reference value. The value thus obtained may be provided, in particular, as a play value for indicating the extent of play.

In particular, the minimum and/or maximum deflection since the last change in the movement direction can be recorded as the position reference value sref. In particular, the diagnostic device 1 is configured to perform a cyclic update of the position reference value sref. By providing the position reference value sref, it is possible to ensure that the correct reference value is available for calculating the current play in the case of jumps in the target value, even after previous continuous changes to the target value or after deflection changes caused by external forces.

Expediently, the diagnostic device 1 is configured to perform the play detection procedure several times to obtain plural pieces of play information, in particular plural play values. The diagnostic device 1 is in particular configured to subject the plural pieces of play information, in particular play values, to a statistical evaluation and/or to a plausibility check in order to obtain adjusted play information, in particular an adjusted play value. Further processing, in particular further processing explained below, expediently takes place on the basis of the adjusted play information, in particular the adjusted play value.

The mentioned statistical evaluation and/or plausibility check is used in particular to reduce or eliminate the influence of falsely recognised play. Incorrect detection of play can occur when break-downs or variations in the deflection velocity are caused, for example, by external forces (such as from the process fluid in the pipeline) or by slip-stick behaviour. However, movement decelerations caused thereby will cause randomly distributed, further scattered values in play detection. By a statistical evaluation and/or plausibility check of successive play values, it can be ensured that the play values are only used in a superordinate evaluation if they are within a specified range and/or if they are consistent with each other within a specified range.

The diagnostic device 1 is expediently configured to perform the play detection procedure in a normal operation of the positioning device. In particular, for the play detection procedure, it is not necessary to switch the operating state to a diagnostic mode with special manoeuvres in the form of predetermined target value jump sequences. Instead, the diagnostic device 1 can detect the play during a normal movement of the drive element 9, i.e. during a movement which serves to influence the process fluid flow in a normal operation.

Expediently, the diagnostic device 1 is configured to use, in the play detection procedure, only the signals already available for other purposes, in particular the position signal, preferably the target value prescribed by the position signal, control signals for the valves of the fluid device 4, preferably the extent of the aeration or deaeration of the pressure chamber 7 prescribed by the control signal, the position of the drive element 9 recorded by the position sensor unit 21, optionally the velocity of the drive element 9 derived therefrom, and/or a pressure detected by the pressure sensor unit 22.

The play information may be expediently further processed or further used in one or more of the ways discussed below:

Preferably, the diagnostic device 1 is configured to compare the play information with a threshold value and to provide warning information based on the comparison. The warning information can for example be provided to a user, the superordinate controller and/or the external server 17. Furthermore, the diagnostic device 1 may also be configured to provide the play information to the external server 17, and the external server 17 may preferably generate the warning information.

The play information can serve in particular as an indicator of a wear condition and/or the functionality of the valve drive 19. Expediently, the diagnostic device 1 can be configured to provide wear information and/or information about the remaining service life on the basis of the play information.

According to a possible embodiment, the play information can be provided on a user interface on the external server 17, for example on a web server provided on the external server 17.

Figure 4:
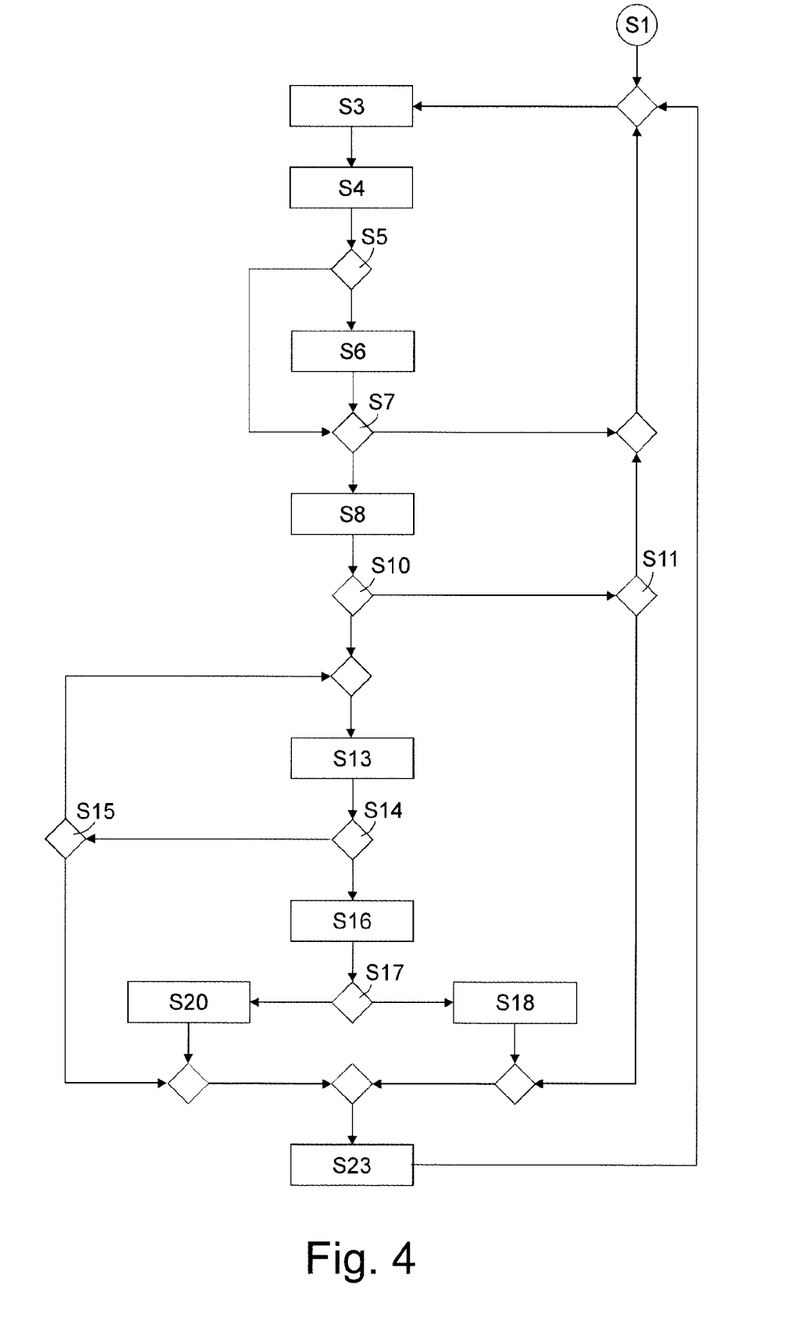
FIG. 4 shows a flow chart of a method for detecting play.

FIG. 4 shows an exemplary embodiment of a method for detecting play between the drive element 9 and the valve member 14 driven by the drive element 9. The method includes detecting the play (steps S4 to S17) and providing the play information according to the detected play (step S18 or S20).

The method is preferably carried out by the diagnostic device 1 explained above.

The method starts at step S1 and then proceeds to step S3. In step S3, the position reference value sref is updated. In particular, a cyclic or continuous updating of the position reference value takes place.

The method proceeds to step S4. In step S4, it is determined how large a prescribed position change is—i.e. how much a target value, prescribed by a position signal, for the position of the drive element 9 or valve member 14 differs from a previous target value and/or a currently recorded position.

The method then proceeds to step S5. In step S5, it is checked whether the prescribed position change is sufficiently large for the detection of play. For this purpose, the prescribed position change is compared, for example, with a threshold value.

If the prescribed position change is large enough (e.g. larger than the threshold value), then the method continues to step S6 where play detection is activated. If the predetermined position change is not large enough (e.g. smaller than the threshold value), then the method proceeds to step S7; the play detection is not activated.

The method then proceeds to step S7 where it is checked if play detection is activated. If play detection is not activated, then the method returns to S3. If play detection is activated, then the method proceeds to step S8.

In step S8, motion detection of the drive element 9 is performed. The motion detection is carried out in particular by the position sensor unit 21.

The method then proceeds to step S10, where it is checked whether movement of the drive element 9 has been detected in the motion detection.

If no movement was detected, in particular no movement in the direction of the position prescribed by the position signal, then the method proceeds to step S11.

In step S11 it is checked whether the control signal has changed and/or whether a timer has finished. The timer is started, for example, when the control signal is provided. The check as to whether the control signal has changed comprises, in particular, the check as to whether a change in the control signal is greater than a predetermined threshold value. If the control signal has not changed significantly, i.e. the change of the control signal is in particular not greater than the threshold value and the timer has not finished, the method proceeds to step S3.

If the control signal has changed substantially, i.e. the change of the control signal is in particular greater than the threshold value and/or the timer has finished, the method proceeds to step S23.

If motion of the drive element 9 is detected in step S10, then the method proceeds to step S13.

In step S13, detection of the signal characteristics SC1, SC2 and/or SC3 takes place. Preferably, detection takes place as to whether the movement of the drive element 9 has slowed down.

The method then proceeds to step S14, where it is checked whether the signal characteristic SC1, SC2 and/or SC3 has been detected. In particular, it is checked whether a deceleration of the movement of the drive element 9 has been detected.

If the signal characteristic SC1, SC2 and/or SC3, in particular the deceleration of the drive element 9, were not recognised, then the method proceeds to step S15. In step S15 it is checked whether the control signal has changed significantly, i.e. in particular whether a change in the control signal is greater than a predetermined threshold value, and/or whether a timer has finished. If the control signal has not changed significantly and the timer has not finished, the method proceeds to step S13.

If the control signal has changed significantly and/or the timer has finished, the method proceeds to step S23.

If the signal characteristic SC1, SC2 and/or SC3, in particular the deceleration of the drive element 9, has been detected, then the method proceeds to step S16.

In step S16, the current deflection of the drive element 9—i.e. the deflection at which the signal characteristic SC1, SC2 and/or SC3 was detected—is recorded as a deflection value.

The method then proceeds to step S17, in which it is checked whether the movement direction of the drive element 9 is positive or negative—i.e. whether the drive element 9 moves in the direction of an increasing position value or a decreasing position value.

If it is determined that the drive element 9 is moving in the direction of an increasing position value, the method proceeds to step S20. In step S20, the difference is formed from the recorded position value and the position reference value sref and provided as a play value or play information.

If, on the other hand, it is determined that the drive element 9 is moving in the direction of a decreasing position value, the method proceeds to step S18. In step S18, the difference of the position reference value sref and the recorded position value is formed and provided as a play value or play information.

The method then proceeds to step S23 where the play evaluation is deactivated. The method then returns to step S3.

What is claimed is:

1. A method for detecting play between a drive element of a valve drive and a valve member of a process valve driven by the drive element, the method comprising the steps of:
    detecting that the deviation between a current position of the drive element and a target position of the drive element prescribed by a first position signal is greater than a predetermined threshold value; and
    detecting that the target position of the drive element prescribed by the first position signal is in a different movement direction relative to a movement direction of a last executed movement of the drive element; and
    performing a play detection procedure in response to the detected deviation between the current position of the drive element and the target position prescribed by the first position signal being greater than the predetermined threshold value, and the detected target position of the drive element being in a different movement direction relative to the movement direction of the last executed movement of the drive element, the play detection procedure comprising:
        recording a time profile of at least one of a position of the drive element, a velocity of the drive element, or a pressure provided to the valve drive;
        detecting a signal characteristic within the recorded time profile, the signal characteristic comprising at least one of a reduction in the velocity of the drive element or an increase in the pressure provided to the valve drive; and
        detecting the play between the drive element and the valve member on the basis of the detected signal characteristic; and
    providing play information according to the detected play, the play information comprising a play value indicating an extent of the play between the drive element of the valve drive and the valve member of the process valve driven by the drive element.

2. The method according to claim 1, further comprising determining, in accordance with at least one of a time and a signal value of the signal characteristic, the play value indicating the extent of the play.

3. The method according to claim 1, further comprising performing the play detection procedure in response to the first position signal.

4. The method according to claim 3, further comprising taking into account, during the play detection procedure, the extent of a position change caused by at least one of the first position signal and the movement direction of the position change caused by the first position signal.

5. The method according to claim 3, further comprising taking into account, during the play detection procedure, an earlier position of the drive element, which was caused by a second position signal provided before the first position signal.

6. The method according to claim 1, wherein the play detection procedure is performed in a normal operation of the positioning device during a normal movement of the drive element, which normal movement serves to influence a process fluid flow in the normal operation.

7. The method according to claim 1, wherein the play is detected without directly detecting the position of the valve member.

8. The method according to claim 1, wherein the detected signal characteristic comprises a temporary drop of the velocity of the drive element to zero.

9. The method according to claim 1, wherein the detected signal characteristic comprises a temporary drop of the velocity of the drive element from a first velocity level, at which the velocity remains temporarily, to a velocity lowest point.

10. The method according to claim 9, wherein the detected signal characteristic further comprises a subsequent increase from the velocity lowest point to a second velocity level.

11. The method according to claim 9, wherein the predetermined threshold value is a predetermined minimum difference between the current target position and the current position of the drive element, which minimum difference ensures that the drive element will move long enough reach the first velocity level.

12. The method according to claim 1, wherein the increase in the pressure provided to the valve drive comprises a temporary increase of a slope of the pressure.

13. The method of claim 12, wherein the detected signal characteristic comprises a subsequent reduction in the slope of the pressure provided to the valve drive.

14. The method of claim 1, further comprising detecting at which position of the drive element the signal characteristic occurs and determining the play value according to this position.

15. The method of claim 1, further comprising checking whether an opening degree of one or more valves of the fluid device actuating the drive element is, for at least a predetermined time duration, above the threshold value, and executing the play detection procedure in response to the opening degree being above the threshold value for the predetermined time duration.

* * * * *